April 9, 1929.                J. A. JACKSON              1,708,887
                           SYSTEM OF MOTOR CONTROL
                             Filed Nov. 21, 1925
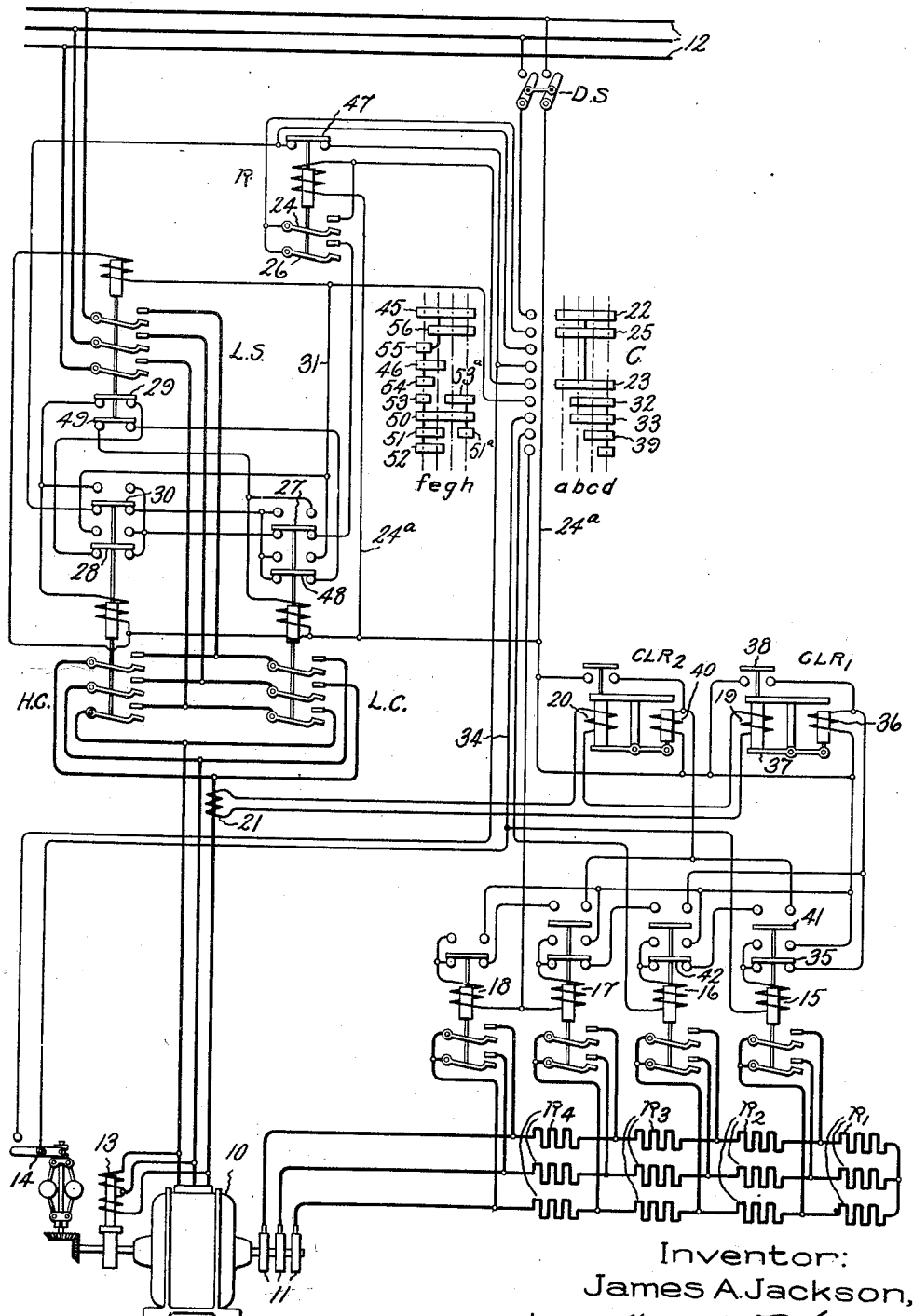
Inventor:
James A. Jackson,
by
His Attorney.

Patented Apr. 9, 1929.

1,708,887

UNITED STATES PATENT OFFICE.

JAMES A. JACKSON, OF SCHENECTADY, NEW YORK, ASSIGNOR TO GENERAL ELECTRIC COMPANY, A CORPORATION OF NEW YORK.

SYSTEM OF MOTOR CONTROL.

Application filed November 21, 1925. Serial No. 70,617.

This invention relates to the control of electric motors, particularly alternating current induction motors that are employed in hoisting, elevator or other similar service and the improvements provided by the invention enable the motor to be controlled so as to operate the load in either direction, as well as to retard or stop the descent of an overhauling load in a safe, efficient and advantageous manner.

In hoist, elevator, or other service where the driving motor may be driven by a descending or overhauling load it is highly desirable from the standpoint of efficient and satisfactory operation to utilize the driving motor as much as possible in retarding and slowing down the load in order to relieve the duty on the friction brakes. With an alternating current driving motor of the slip ring induction type it has been common practice to slow down the descending load by plugging or reversing the motor power by connections with resistance in the secondary circuit so that the motor exerts an active torque in the hoisting direction and in opposition to the torque produced by the descending or overhauling load. However, if the load is started from rest, the actual movement of the load obviously will depend upon the relative values of the load torque and the hoisting torque of the motor. When the load torque predominates, the motor torque serves to slow down the descent of the load but when the motor torque predominates the load is driven in the hoisting direction.

In order to avoid confusion to the operator, my improved motor control system is arranged to connect the motor so as to exert a positive torque in the lowering direction when the motor is initially connected to the power source on the lowering side of the controller and thereby insure that the movement of the load always occurs in the downward direction. Preferably the initial lowering connections of the motor are such that the accelerating torque of the motor is sufficiently low to prevent unwinding the hoist cable faster than the load descends. Otherwise, undesirable and dangerous slack is introduced into the cables. Furthermore, the slow acceleration of the descending load facilitates jogging of the motor to lower the load a slight amount.

When an alternating current electric motor of the slip ring induction type is employed, the accelerating torque of the motor varies with the amount of resistance in the secondary circuit and in all cases automatically terminates when synchronous speed is reached. In case an overhauling load drives the motor above synchronous speed, the motor then automatically exerts a braking effect as an asynchronous generator, the value of which also is dependent upon the value of the resistance in the secondary circuit of the motor. Hence, while it is desirable to start the motor in the lowering direction with sufficient resistance in the secondary circuit of the motor, to limit the rate of acceleration of the descending load, the same value of resistance in the secondary circuit limits the braking action of the motor, and consequently, permits the overhauling load to drive the motor at an excessive and dangerous speed.

One of the principal objects of the present invention is to provide a control arrangement whereby a driving motor of the above character may be connected initially to operate the load in the lowering direction at slow speed and subsequently connected either at the will of the operator or automatically to regeneratively brake the load to a safe speed in case the load overhauls the motor. The control arrangement then permits the motor connections to be reversed so as to oppose the torque of the motor to the torque of the overhauling load in order to thereby slow down and stop the descent of the load.

Other objects of the invention will be apparent from the description of the embodiment of the invention illustrated in the accompanying drawing in which the single figure is a schematic diagram showing the invention applied to a control system for an alternating current hoisting motor of the slip ring type.

As illustrated in the drawing, the three phase, alternating current motor 10 has the slip rings 11 connected to the secondary or rotor windings, and while not shown in the drawing, it will be understood that the motor is connected through suitable gearing to drive the winding or hoisting drum of a hoist or elevator. Power is supplied to the primary windings of the motor from the supply lines 12, through the electromagnetic line switch LS and one of the reversing contactors HC or LC, the contactor HC being closed when the motor 10 is operating in the hoisting direction and the contactor LC being closed when the motor is operating in the lowering direction. An electromagnetic brake 13 of any suitable form is provided for holding the motor at rest when the primary windings thereof are deenergized. A centrifugal speed-responsive circuit controlling device 14 is suitably geared to the motor shaft and is arranged to cooperate in controlling the motor in a manner which will be more fully set forth in connection with the operation of the motor.

The torque, and consequently the speed, of the motor is controlled by means of the several resistors $R^1$, $R^2$, $R^3$, $R^4$, which are connected to the secondary or rotor windings of the motor through the slip rings 11, and are under the control of the electromagnetic contactors 15, 16, 17, 18, respectively.

The operation of the line switch, the reversing contactors HC and LC, and also the resistance controlling contactors 15, 16, 17, 18 are under the control of a manually operable master controller C which is operable from the off position in which it is shown through either the several hoisting positions $a$, $b$, $c$, $d$, or through the lowering positions $e$, $f$, $g$, $h$. In order to insure a smooth and gradual acceleration of the load during both the hoisting and the lowering operation, the current limit relays $CLR^1$, $CLR^2$ have windings 19 and 20 energized in accordance with the motor current through the current transformer 21 when the motor is operating in both the hoisting and the lowering direction, and are connected to cooperate with the controller C in controlling the response of the resistance contactors when the motor current exceeds a suitable operating value.

The relay R and the centrifugal switch 14 cooperate with the main controller C to automatically retard an overhauling load in a manner which will be better understood from a consideration of the operation of the control system which is as follows:

To start and accelerate motor 10 in the hoisting direction, the control disconnecting switch DS is closed and the controller C is operated into the first hoisting position, indicated in the drawing as $a$. This establishes an energizing circuit for the relay R which may be traced from the middle supply line through the disconnecting switch, the segments 22 and 23 of the controller C, the winding of the relay R, thence through the conductor $24^a$ and the disconnecting switch to the upper supply line. With the line switch LS and the reversing contactors HC and LC in their biased positions in which they are shown, the resulting closure of the relay contacts completes a holding circuit for the operating winding of the relay through the contact 24 and the controller segment 25, and at the same time establishes an energizing circuit for the contactor HC extending from the middle supply line through the disconnecting switch, the contact segments 22 and 25, relay contact 26, the interlocking contact 27 on the lowering contactor LC, interlocking contact 28 on the hoisting contactor HC, thence through the interlocking contact 29 on the line switch LS and the operating winding of the contactor HC to the conductor $24^a$ which is connected by the disconnecting switch DS to the upper supply line. The contactor HC at once closes to make connections for operating the motor 10 in the hoisting direction when the line switch LS is closed. A holding circuit for the operating winding of the contactor HC is completed through the interlocking contact 30 when the contactor closes. At the same time an energizing circuit for the operating winding of the line switch is established by the contact 28, the circuit extending from the middle supply line, through the disconnecting switch DS, the segments 22 and 25, relay contact 26, the lowering contactor, interlocking contact 27, the hoisting contactor, interlocking contact 28, the conductor 31, thence through the winding of the line switch and the conductor $24^a$ to the upper supply line.

The resulting closure of the line switch completes the connection of the motor 10 to the supply lines 12 for operation in the hoisting direction with all of the resistors $R^1$, $R^2$, $R^3$, $R^4$ in the secondary circuit, the electromagnetic brake 13 being released to permit the motor to operate at minimum speed.

To accelerate the motor 10, the controller C is operated into position $b$ to establish an energizing circuit for the operating winding of the resistance controlling contactor 15, which may be traced from the middle supply line through the disconnecting switch, the segments 22, 25, the controller C, relay contact 26, auxiliary contacts 27, 28 of the contactors LC, HC respectively, conductor 31, controller segments 32, 33 conductor 34, the winding of contactor 15, the auxiliary contact 35, with which the resistance contactor is provided, the winding 36 of the current limit relay $CLR^1$, thence through the conductor $24^a$ and the disconnecting switch to the upper supply line. The resistance of the current limit relay winding 36 is such that the energization of the operating winding of contactor 15 is insufficient to operate the contactor to the closed position. However, the energization of winding 36 is sufficient to operate the arm 37 out of engagement with the plunger controlled by the winding 19 and operatively connected with the contact 38 of the current limit relay. Consequently, the contact 38 is maintained in the open position as long as the energization of winding 19 from the current transformer 21 is above a predetermined value.

After the motor 10 has accelerated to the minimum speed and the current supplied to the motor through the primary of the current transformer 21 has decreased to the normal operating value, the energization of winding 19 is correspondingly reduced to a sufficient value to permit the contact 38 to drop to the closed position. This short circuits the winding 36 and thereby increases the energization of the operating winding of contactor 15 sufficient to operate the contactor to the closed position and short circuit the resistors $R^1$. It will be seen that the auxiliary contact 35 completes a holding circuit for the operating winding of the contactor 15 which is entirely independent of the current limit relay $CLR^1$.

Upon the removal of the resistors $R^1$ from the secondary of the motor 10 the latter accelerates to a higher speed. If the controller now is operated into position $c$, the resistance contactor 16 is energized through the controller segment 39 with the winding 40 of current limit relay $CLR^2$ in series therewith, the circuit including the interlocking contact 41 of resistance contactor 15. The current limit relay $CLR^2$ functions to prevent response of the resistance contactor 16 until the motor current decreases to the normal operating value in exactly the same manner as just described in connection with the current limit relay $CLR^1$. Closure of resistance contactor 16 establishes a holding circuit for the operating winding thereof through the auxiliary contact 42 and also short circuits the resistors $R^2$ to further accelerate the motor 10.

Upon operation of the controller C into position $d$, for full speed normal hoisting operation of motor 10, the resistance contactor 17 is first closed under the control of the current limit relay $CLR^1$ when the motor current decreases to the proper value and then the resistance contactor 18 is closed under the control of the current limit relay $CLR^2$ in a similar manner to successively short circuit the resistors $R^3$, $R^4$, and thereby bring the motor up to full speed in the hoisting direction. Hoisting operation of the motor is stopped and the electromagnetic brake 13 is reapplied by returning the controller C to the off position.

Where the value of the overhauling load driven by the motor 10 varies between wide limits, as where the motor is operating a hoist where the load may vary from rated load to an empty bucket, it is necessary that the motor be arranged not only to operate the light load in the lowering direction, or electrically brake a heavy load, but also to stop the descent of the load in order to lessen the duty on the electromagnetic brake. Since the alternating current driving motor of the slip ring induction type illustrated is capable of retarding the load only when either the motor is driven by the load above synchronous speed or the power connections of the motor are reversed or "plugged" to oppose the driving torque of the motor against the torque exerted by the descending load, the proper value of the retarding effect of the motor obviously will depend upon the value of the overhauling load. Furthermore, in order to facilitate jogging or dropping the hoist bucket a relatively short distance, it is desirable that the operation of the motor to drive the bucket in the lowering direction start at the lowest possible speed, as otherwise the motor may drive the hoisting drum more rapidly than the bucket falls where the acceleration of the bucket is retarded by the friction of guide sheaves and other mechanical parts. Otherwise a slack is introduced into the hoisting rope which will prevent accuracy in the control, as well as cause undesirable and dangerous whipping of the hoist ropes. With the control system illustrated in the drawing, these undesirable results are avoided and the descent of the load at all times is under accurate control and the lowering speed is automatically maintained within safe limits. The control is arranged so that the motor always is connected initially to accelerate the load in the downward direction at a slow rate preparatory to braking the load by regulative action of the motor to maintain the speed of the overhauling descending load within safe operating limits. Finally the power connections of the motor are reversed to retard the descent of the load prior to applying the electromagnetic brake to stop the load.

The operation in handling the descent of the overhauling load is as follows: The controller C is operated from the off position through successive lowering positions $h$, $g$, into the position $e$. No control circuits are established in positions $h$, $g$. In position $e$ an energizing circuit for the operating winding of the lowering contactor LC is established from the middle supply line through the segments 45 and 46, the auxiliary contact 47 of the relay R, the interlocking contact 30 of contactor HC, the contact 48 of the lowering contactor, the auxiliary contact 49 of the line switch, thence through the operating winding of the lowering contactor, the conductor $24^a$ and the disconnecting switch DS to the upper supply line. Upon response of the lowering contactor LC to connect the motor 10 for operating in the lowering direction, a holding circuit is established by contact 27 and an energizing circuit to the operating winding of the line switch is established by the contact 48, each of which includes the relay contact 47 and the interlocking contact 30 of the hoisting contactor HC. It should be noted that the interlocking between the line contactor LS, the hoisting contactor HC, and the lowering contactor LC effectively insures against improper operation in case any contactor sticks or "freezes" closed. The line switch at once operates to complete the lowering power connections for motor 10 with all of the resistors $R^1$, $R^2$, $R^3$, $R^4$ connected in the secondary circuit of the motor to start operation thereof at minimum speed. In the lowering position $e$ the resistance controlling contactors are maintained deenergized as long as the motor 10 operates at the minimum speed. However, in case the load, after the release of the electromagnetic brake, should tend to overhaul the motor and drive the same above synchronous speed, the retarding action of the motor with all of the resistors $R^1$, $R^2$, $R^3$, $R^4$ in the secondary circuit is slight. The maximum retarding effect is obtained only when all of the secondary resistors are short circuited. Hence, in order to prevent the overhauling load from driving the motor 10 at excessive speed, the centrifugal switch 14 is arranged to close when the motor speed exceeds the synchronous value.

Upon the closure of the speed-responsive switch 14 the resistance contactor 15 is energized through a circuit including the segments 45, 46, the contact of the speed-responsive switch 14, the winding of contactor 15, the auxiliary contact 35, the winding 36 of the current limit relay $CLR^1$, as well as the conductor $24^a$. The closure of the resistance contactor 15 is controlled by the current limit relay in substantially the same manner as previously described. The current limit relay winding 19 is energized from the current transformer 21 in order to prevent too rapid acceleration of the overhauling load in the lowering direction. After the contactor 15 closes the closure of the remaining resistance contactors 16, 17, 18 follows in sequence under the alternate control of the current limit relays $CLR^2$ and $CLR^1$ in a manner similar to that previously described as the energizing circuit for the remaining contactors are established through conductor 34 and the segments 50, 51, 52 respectively. In this way the speed-responsive switch 14 serves to automatically control the resistance contactors so as to short circuit the secondary resistance of the motor when the motor speed exceeds the synchronous value while the motor is operating on the initial lowering point $e$. With the secondary resistor short circuited the retarding action of the motor at supersynchronous speed is increased sufficiently to prevent the load from driving the motor at an excessive or dangerous speed.

In case the load should not overhaul the motor or the power connections for operating the motor at low speed in the lowering direction are not continued for a sufficient time to permit the overhauling load to drive the motor above synchronous speed, the speed-responsive device 14 will not operate to remove the resistance from the secondary circuit of the motor. Under these conditions, controller C may be operated into the extreme position $f$ in order to complete a circuit in shunt with the contacts of the speed-responsive device 14 through the controller segments 53 and 50. Thus, in position $f$ the controller establishes circuits through which all of the resistance contactors 15, 16, 17, 18 are energized to close under the alternate control of the current limit relays $CLR^1$ and $CLR^2$, and thereby operate the motor 10 at maximum speed in the lowering direction with all of the secondary resistors short circuited.

If, now, it should be desired to retard the descent of the load, the controller C is returned to position $e$ and the control arrangement is such that the resistors are reinserted in the secondary circuit of the motor and the power connections of the motor are reversed to oppose the torque of the motor to the torque of the overhauling load. This is due to the fact that in position $f$ the relay R is energized through the circuit extending from the middle power conductor through the controller segments 45 and 54, the winding of relay R, thence through the conductor $24^a$ to the upper supply line. The opening of the relay contact 47 does not interrupt the energizing circuit for the operating winding of the lowering contactor LC and the line switch LS due to the fact that the contact 47 is shunted by the circuit extending through the controller segment 55. When the controller is returned to position $e$, a holding circuit for the operating winding of the relay R is completed through the controller segments 56 and the contact 24 of the relay. At the same time, the return of the controller C to the position $e$ interrupts the energizing circuit for the lowering contactor LC and the line switch LS due to the fact that the shunt circuit around the relay contact 47 through the controller segment 55 is broken. This results in the opening of the lowering contactor and also the line switch. Thereupon the operating winding of the hoisting contactor HC is energized through the circuit extending through the middle supply line, the controller segments 45 and 56, relay contact 26, with the relay in the energized position, the contact 27 with the lowering contact in the open position, the contact 28 with the hoisting contactor in the open position, the contact 29 with the line switch in the open position, thence through the operating winding of the hoisting contactor and the conductor 24ª, to the upper supply line. The hoisting contactor immediately closes and energizes the operating winding of the line switch in the manner previously described and upon closure of the latter the motor 10 is connected to the supply line 12 to oppose the active torque of the motor, with the resistors R¹, R², R³, R⁴, in secondary circuit, to the torque of the descending load. With the motor driven by the load at a speed well above the synchronous value, the torque of the motor with all of the resistors in secondary circuit is of sufficient value to predominate over the torque of the load. Consequently, the speed of descent of the load is decreased. As the speed decreases controller C is operated into position $g$ to establish an energizing circuit through the segment 53ª of the operating winding of resistor contactor 15. The latter closes under the control of the current limit relay CLR¹ and removes the resistor R¹ from the secondary circuit of the motor, thereby increasing the value of the torque exerted by the motor at the reduced speed thereof. The speed of the descending load is further decreased.

In order to stop the load controller C is returned to the position $h$ in which the resistor contactor 16 is energized through a circuit established by the controller segment 51ª and functions to remove the resistors R² from the secondary circuit of the motor. Preferably, the resistors are so proportioned that the remaining resistors R³, R⁴, in the secondary circuit of the motor cause the motor to exert a maximum opposing torque to the load as the speed of the descending load and, consequently the motor speed, approaches zero. As the maximum opposing torque of the motor brings the descending load to rest the controller C is moved to the off position, thus deenergizing the hoisting contactor HC and the line switch LS to interrupt the motor circuit and set the electromagnetic brake 13.

From the foregoing it will be seen that a control system embodying my invention permits the motor to drive the load in both the hoisting and the lowering direction, and also insures automatically that the motor is not driven at an excessive speed by an overhauling descending load. Furthermore, the control arrangement permits the torque of the motor to be opposed to the torque of the descending load and to be suitably varied to bring the load to rest from any operating speed.

What I claim as new and desire to secure by Letters Patent of the United States, is:

1. The combination with an alternating current induction motor adapted to drive and to be driven by an active load, of switch mechanism for establishing power connections for the motor, a resistor arranged to be connected in circuit with the motor for varying the operating speed thereof, and means responsive to the speed of the motor for automatically establishing a short circuit about said resistor upon a change from motoring operation to braking operation of said motor.

2. The combination with an alternating current induction motor adapted to drive and be driven by an active load, of switch mechanism for establishing power connections for the motor, a speed controlling resistor connected in the secondary circuit of the motor, independently operable switch mechanism for controlling a short circuit around the said resistor to vary the speed of the motor, and automatic means responsive to the speed of the motor and arranged to effect operation of said independently operable switch mechanism to establish a short circuit about said resistor when the operation of said motor changes from motoring to braking operation thereof.

3. The combination with an alternating current induction motor adapted to drive and be driven by an active load, of a resistor connected in the secondary circuit of the motor for controlling the subsynchronous operating speed thereof, and switch mechanism responsive to the speed of the motor arranged to establish a short circuit about said resistor upon a change from motoring operation to braking operation of said motor.

4. The combination with an electric motor, of reversing switch mechanism for controlling the connection of the motor to a source of supply, and means for controlling said reversing switch mechanism including a controller having an off and a plurality of operative positions and arranged to effect operation of the reversing switch mechanism to connect the motor for operation in one direction when the controller is moved to a predetermined operative position from the off position and to connect the motor for operation in the opposite direction when the controller is moved to said predetermined operative position from another operative position.

5. The combination with an electric motor, of reversing switch mechanism for controlling the power connections of the motor, and means for controlling said switch mechanism including a controller having a plurality of operative positions and arranged to effect operation of the reversing switch mechanism to establish and maintain power connections for operation of the motor in one direction when the controller is moved through an intermediate operative position from one operative position to a second operative position and to establish reverse power connections for the motor when the controller is returned from said second position to said intermediate operative position.

6. The combination with an electric motor of reversing switch mechanism for controlling the power connections of the motor and means for controlling said reversing switch mechanism including a controller having an off and a plurality of operative positions and arranged to effect operation of the reversing switch mechanism to establish power connections for operation of the motor in one direction when the controller is moved from the off position to an operative position intermediate two other operative positions and to maintain said power connections established while the controller is advanced to one of said other operative positions and to establish and maintain reverse power connections for the motor when the controller is returned through said intermediate position from said one of said operative positions to the other of said operative positions.

7. The combination of an electric motor adapted to drive and be driven by an active load, of electroresponsive reversing switch mechanism for controlling the power connections of the motor, and means for controlling said reversing switch mechanism including a controller having an off position and a plurality of operative positions and arranged to effect operation of the reversing switch mechanism to establish power connections for operation of the motor to drive the load in one direction upon movement of the controller from the off position to a predetermined operative position and to establish reverse power connections to oppose the torque of the motor to the torque of an overhauling load upon the return of the controller from another position to said predetermined operative position.

8. The combination of an alternating current induction motor adapted to drive and be driven by an active load, of a resistor connected in the secondary circuit of the motor for controlling the operating speed thereof, electroresponsive switch mechanism for controlling both the power connections of the motor and the said speed regulating resistor, and means for controlling said switch mechanism including a controller having an off position and a plurality of operative positions arranged to effect operation of the said electroresponsive switch mechanism to establish power connections for operation of the motor with said resistor in circuit therewith to drive the load in one direction upon movement of the controller from the off position to a predetermined operative position and to establish reverse power connections with said resistor in the motor circuit upon the return of the controller from another operative position to said predetermined operative position.

9. The combination of an alternating current induction motor adapted to drive and to be driven by an active load, of a resistor connected in the secondary circuit of the motor for controlling the operating speed thereof, electroresponsive switch mechanism for controlling the power connections of the motor and the said speed regulating resistor, and means for controlling said switch mechanism including a controller having an off position and a plurality of operative positions and arranged to effect operation of the said switch mechanism to establish power connections for operation of the motor with said resistor in circuit therewith to drive the load in one direction upon movement of the controller from the off position to a predetermined operative position intermediate two other operative positions and to maintain said power connections established and remove said resistor from the motor circuit when the controller is advanced to one of said other operative positions and to establish reverse power connections for the motor with said resistor in circuit therewith upon the return of the controller to said intermediate position and to maintain said reverse power connections established and remove said resistor from the motor circuit when the controller is operated to the other of said operative positions.

10. In an elevator or hoisting motor control system, the combination with an electric motor adapted to drive and be driven by an active load, of electroresponsive switch mechanism for controlling the power connections of the motor, and means for controlling said switch mechanism comprising a controller having an off position, a plurality of hoisting positions and a plurality of lowering positions arranged to effect operation of said switch mechanism to establish power connections for operation of the motor in the lowering direction when the controller is operated from the off position to a predetermined lowering position and to establish power connections for operation of the motor in the hoisting direction upon the return of the controller from another operative position to said predetermined position.

11. In an elevator or hoisting control system, the combination with an alternating current induction motor, of a resistor connected in the secondary circuit thereof for controlling the operating speed of the motor, electroresponsive switch mechanism for controlling the power connections of the motor and the said resistor, and means for controlling said switch mechanism comprising a controller having an off position intermediate a plurality of hoisting positions and a plurality of lowering positions and arranged to establish power connections to operate the motor in the lowering direction with said resistor in circuit therewith upon operation of the controller from the off position to a lowering position intermediate two other lowering positions and to maintain said connections established and to remove said resistor from the motor circuit upon operation of the controller to one of said other lowering positions, and to establish reverse power connections to the motor with said resistor in circuit therewith upon the return of the controller to said intermediate position and to maintain said reverse power connections established and remove said resistor from the motor circuit upon operation to the other of said lowering positions.

12. The combination with an alternating current motor adapted to drive and to be driven by an active load, of a controller having an off position and at least one operative position for controlling the operation of said motor, a resistor connected in circuit with said motor at all subsynchronous speeds thereof with said controller in said operative position, and means responsive to the speed of said motor for short circuiting said resistor when said motor is driven by the load above synchronous speed.

13. The combination with an alternating current motor adapted to drive and to be driven by an active load, of a controller having an off position and at least one operative position for controlling the operation of the motor, a resistor connected in circuit with said motor for all subsynchronous speeds thereof when said controller is moved from off position to said operative position and means responsive to the speed of the motor for short circuiting said resistor when the motor is driven above synchronous speed by the load.

14. The combination with an alternating current motor adapted to drive and to be driven by an active load, a resistor connected in circuit with said motor and electroresponsive switch mechanism for controlling said resistors, a motor controller having an off position and a plurality of operative positions and arranged when moved from off position to one of said operative positions to prevent operation of said switch mechanism to short circuit said resistors for subsynchronous speeds of said motor, and a centrifugal speed responsive device cooperating with said controller when operated to said one of said operative positions for operating said switch mechanism to short circuit said resistor when the motor is driven by the load above synchronous speed.

In witness whereof, I have hereunto set my hand this 20th day of November, 1925.

JAMES A. JACKSON.